United States Patent
Avudaiyappan et al.

(10) Patent No.: US 8,402,232 B2
(45) Date of Patent: Mar. 19, 2013

(54) MEMORY UTILIZATION TRACKING

(75) Inventors: Karthikeyan Avudaiyappan, Sunnyvale, CA (US); Terry Whatley, Nevada City, CA (US)

(73) Assignee: Oracle America, Inc., Redwood Shores, CA (US)

(*) Notice: Subject to any disclaimer, the term of this patent is extended or adjusted under 35 U.S.C. 154(b) by 637 days.

(21) Appl. No.: 12/645,661

(22) Filed: Dec. 23, 2009

(65) Prior Publication Data

US 2011/0153928 A1 Jun. 23, 2011

(51) Int. Cl.
G06F 12/00 (2006.01)
G06F 12/06 (2006.01)
G06F 13/00 (2006.01)
G06F 13/28 (2006.01)
G06F 1/26 (2006.01)
G06F 1/32 (2006.01)

(52) U.S. Cl. ............ 711/156; 711/5; 711/104; 713/320

(58) Field of Classification Search ............... 711/5, 104, 711/156; 713/320
See application file for complete search history.

(56) References Cited

U.S. PATENT DOCUMENTS

| | | | | |
|---|---|---|---|---|
| 5,911,081 | A * | 6/1999 | Whatley et al. | 713/320 |
| 7,356,665 | B2 * | 4/2008 | Rawson, III | 711/202 |
| 2005/0125702 | A1 * | 6/2005 | Huang et al. | 713/320 |
| 2005/0125703 | A1 * | 6/2005 | Lefurgy et al. | 713/320 |
| 2007/0011421 | A1 * | 1/2007 | Keller et al. | 711/165 |
| 2007/0083701 | A1 * | 4/2007 | Kapil | 711/106 |

OTHER PUBLICATIONS

Hewlett-Packard Corporation, Intel Corporation, Microsoft Corporation, Phoenix Technologies Ltd, and Toshiba Corporation, "Advanced Configuration and Power Interface Specification," Revision 4.0, Jun. 16, 2009, 46 pages.

* cited by examiner

*Primary Examiner* — Michael Alsip
(74) *Attorney, Agent, or Firm* — Osha Liang LLP

(57) ABSTRACT

A hardware memory control unit that includes a register block and hardware logic. The register block includes, for a hardware memory segment, an access count register, a low threshold register, and a high threshold register. The hardware logic includes functionality to increment the access count stored in the access count register for each memory access to the hardware memory segment performed during a predefined duration of time, and, at the end of the predefined duration of time, perform a response action when the access count stored in the access count register is less than the low threshold stored in the low threshold register, and perform a response action when the access count stored in the access count register is greater than the high threshold stored in the high threshold register. A power saving mode of the hardware memory segment is modified based on performing the response action.

19 Claims, 3 Drawing Sheets

MEMORY UTILIZATION TRACKING

BACKGROUND

In general, the functionality of a computer system is achieved using the combination of hardware and software. The hardware includes functionality to execute the instructions defined in the software. The combination of the hardware and the software allows the user to perform various tasks, such as play games, perform word processing applications, perform complicated modeling of a geographical region, design new technologies, and/or perform other such tasks.

The hardware includes various components to facilitate the processing of instructions. Specifically, the hardware includes a computer processor and hardware memory modules. The hardware memory modules provide memory for storing data for use by the computer processor. For example, the data may include the instructions being executed by the computer processor and information required by the instructions to execute. When the computer processor requires data from memory, the computer processor sends a request to a memory control unit. The memory control unit identifies the physical location on a hardware memory module in which the data is located, obtains the data from memory, and transmits the data to the processor.

Occasionally, the computer processor may not require the use of memory. For example, the computer processor may have suspended processing instructions. On such occasions, memory provided by the hardware memory modules may be idle. To conserve power when the memory is idle, the memory is switched to a power down state.

SUMMARY

In general, in one aspect, the invention relates to a hardware memory control unit that includes a register block and hardware logic. The register block includes a first access count register for storing an access count for a first hardware memory segment, a first low threshold register for storing a low threshold for the first hardware memory segment, and a first high threshold register for storing a high threshold for the first hardware memory segment. The hardware logic includes functionality to increment the access count stored in the first access count register for each memory access to the first hardware memory segment performed during the first predefined duration of time, and, at the end of the first predefined duration of time, generate a trap when the access count stored in the first access count register is less than the low threshold stored in the first low threshold register, and generate the trap when the access count stored in the first access count register is greater than the high threshold stored in the first high threshold register. A power saving mode of the first hardware memory segment is modified when the trap is generated.

In general, in one aspect, the invention relates to a hardware memory control unit that includes a register block and hardware logic. The register block includes a first access count register for storing an access count for a first hardware memory segment, a first low threshold register for storing a low threshold for the first hardware memory segment, and a first high threshold register for storing a high threshold for the first hardware memory segment. The hardware logic includes functionality to increment an access count stored in the first access count register for each memory access to the first hardware memory segment performed during the first predefined duration of time, and at the end of the first predefined duration of time, automatically modify a power saving mode of the first hardware memory segment to power down precharge slow exit when the access count stored in the first access count register is less than the low threshold stored in the first low threshold register, and automatically modify the power saving mode of the hardware memory segment to power down precharge fast exit when the access count stored in the first access count register is greater than the high threshold stored in the first high threshold register.

In general, in one aspect, the invention relates to a hardware memory control unit that includes a register block for each hardware memory segment of a plurality of hardware memory segments. The register block includes an access count register for storing an access count of memory accesses performed to the hardware memory segment during a predefined duration of time, a high threshold register for storing a high threshold, wherein the high threshold defines a maximum number of memory accesses before a power saving mode of the hardware memory segment is switched to power down precharge fast exit, a low threshold register for storing a low threshold, wherein the low threshold defines a minimum number of memory accesses before the power saving mode of the hardware memory segment is switched to power down precharge slow exit, a status register for storing the current status of the hardware memory segment, and a control register for storing a response action indicator. The hardware memory control unit further includes hardware logic that includes functionality to perform a response action specified by the response action indicator when the access count stored in the access count register is less than a low threshold stored in the low threshold register, and perform the response action specified by the response action indicator when the access count stored in the access count register is greater than a high threshold stored in the high threshold register.

Other aspects of the invention will be apparent from the following description and the appended claims.

DETAILED DESCRIPTION

Figure 1:
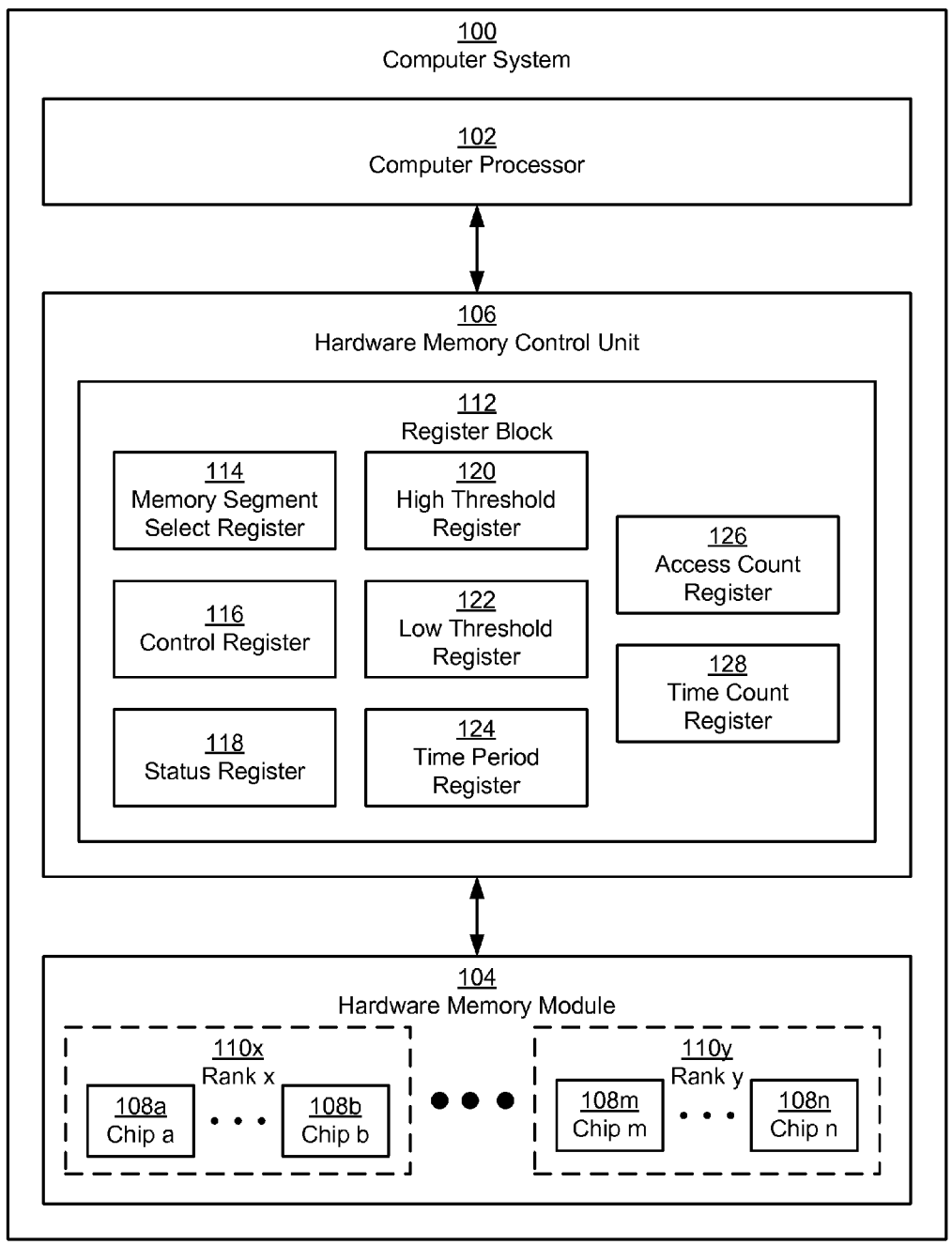
FIG. 1 shows a computer system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to performing power saving management of hardware memory modules on a per hardware memory segment basis. In one or more embodiments of the invention, the hardware memory segment corresponds to at least a portion of one or more hardware memory modules. The hardware memory segment is discussed below. The power state of the hardware memory segment may be an active state or a power down state. In the active state, the hardware memory segment is able to receive and process memory requests. In the power down state, the hardware memory segment conserves power and does not process memory requests in one or more embodiments of the invention. Thus, to process memory requests when the hardware memory segment is in power down state, the hardware memory segment first switches to active state in accordance with one or more embodiments of the invention.

When a hardware memory segment is idle, the power state of the hardware memory segment is switched to a power down state specified by a power saving mode associated with the hardware memory segment. In one or more embodiments of the invention, the power saving mode may be powerdown precharge fast exit (PPFE) mode or powerdown precharge slow exit (PPSE) mode. In one or more embodiments of the invention, the power down state may be PPFE state or PPSE state. For example, when the hardware memory segment is idle, the hardware memory segment switches to PPFE state when the hardware memory segment is set in the PPFE mode. Conversely, when the hardware memory segment is idle, the hardware memory segment switches to PPSE state when the hardware memory segment is set in the PPSE mode. In one or more embodiments of the invention, the PPSE state saves more power than the PPFE state at the cost of a higher enter and exit time to the state.

In general, embodiments of the invention are directed to a hardware memory control unit for performing memory utilization band tracking of the hardware memory segments. Specifically, the memory utilization band tracking tracks the number of memory accesses to a hardware memory segment over a period of time. The band is a set of acceptable memory accesses that is greater than a low threshold and less than a high threshold. Thus, if the number of memory accesses is less than a high threshold and greater than a low threshold, then the memory utilization of the hardware memory segment is in-band. Accordingly, the power saving mode of the hardware memory segment does not change. Conversely, if the number of memory accesses is greater than a high threshold or less than a low threshold, then the memory utilization of the hardware memory segment is out-of-band. In one or more embodiments of the invention, if the number of memory accesses is equal to either the high threshold or the low threshold, then the memory utilization of the hardware memory segment may be considered out-of-band. In alternative embodiments, the memory utilization of the hardware memory segment may be considered in-band when the number of memory accesses is equal to either the high threshold or the low threshold.

When the memory utilization is out-of-band, the power saving mode is switched to the appropriate mode. Accordingly, because the hardware memory control unit performs the memory utilization band tracking, the computer processor is not interrupted when the number of memory accesses is in-band.

FIG. 1 shows a schematic diagram of a computer system in accordance with one or more embodiments of the invention. The computer system (100) may be any type of computing device. For example, the computer system (100) may be a personal computer, a mobile computing device, a server, or any other type of computing device. As shown in FIG. 1, the computer system (100) includes one or more computer processor(s) (102), one or more hardware memory modules (104), and a hardware memory control unit (106).

In one or more embodiments of the invention, the computer processor (102) is a hardware component configured to process instructions. The computer processor (102) may have a single micro core or have multiple processing cores. Further, the computer system (100) may include multiple computer processors.

The hardware memory module (104) is a hardware component for storing data. In one or more embodiments of the invention, the hardware memory module is a circuit board that includes random access memory (RAM) chips (e.g., chip a (108a), chip b (108b), chip m (108m), chip n (108n)). In one or more embodiments of the invention, each hardware memory module (104) is a separate field replaceable unit in the computer system. For example, the hardware memory module may be a dual inline memory module (DIMM), a single inline memory module (SIMM), or any other type of field replaceable unit that includes memory.

In one or more embodiments of the invention, the RAM chips (e.g., chip a (108a), chip b (108b), chip m (108m), chip n (108n)) on a hardware memory module may be partitioned into ranks (e.g., rank x (110x), rank y (110y)). In other words, each RAM chip (e.g., chip a (108a), chip b (108b), chip m (108m), chip n (108n)) is only assigned to a single rank (e.g., rank x (110x), rank y (110y)) in accordance with one or more embodiments of the invention. The number of RAM chips (e.g., chip a (108a), chip b (108b), chip m (108m), chip n (108n)) in a rank (e.g., rank x (110x), rank y (110y)) corresponds to the number of RAM chips that can be accessed for a full data bit width of the hardware memory module. Thus, only one rank (e.g., rank x (110x), rank y (110y)) can be accessed at a time in accordance with one or more embodiments of the invention. For example, consider an example in which hardware memory module (104) has a data bit width of sixty four bits, each RAM chip has sixteen bits that can be accessed at a time, and the hardware memory module has eight RAM chips. In the example, the RAM chips on the hardware memory module may be partitioned into two ranks with each rank having four chips because 4 multiplied by 16 is 64.

In one or more embodiments of the invention, ranks (e.g., rank x (110x), rank y (110y)) are grouped into a hardware memory segment(s) (not shown) for power savings management. The ranks (e.g., rank x (110x), rank y (110y)) in a single hardware memory segment may span multiple hardware memory modules (104), correspond to all or a portion of the ranks on a single hardware memory module (104), or include a portion of the ranks on different hardware memory modules (104) in accordance with one or more embodiments of the invention. For example, the hardware memory segment may correspond to all the ranks on two hardware memory modules (104) in accordance with one or more embodiments of the invention.

Continuing with FIG. 1, in one or more embodiments of the invention, a hardware memory control unit (106) is operatively interposed between the computer processor (102) and the hardware memory module (104). The hardware memory control unit (106) includes hardware logic necessary to read and write to the hardware memory module (104) and execute the functionally described in FIG. 2. In one or more embodiments of the invention, the hardware logic may be implemented an integrated circuit (e.g., as a collection of gates—AND, NAND, NOR, XOR, OR, etc.), as firmware configured to execute on a processor(s) in the hardware memory control unit (106) or any combination thereof.

The hardware memory control unit (106) may include functionality to identify the physical location from which to store or retrieve data, to access the hardware memory module (104) at the physical location, and to store or retrieve data for the computer processor (102). In one or more embodiments of the invention, the hardware memory control unit (106) is further configured to perform power management of the hardware memory segment(s). For example, the hardware memory control unit (106) may be configured to refresh the hardware memory modules, monitor the memory accesses to the hardware memory segment(s), change the power saving mode of the hardware memory segment(s), and change the power state of the hardware memory segment(s). The hardware memory control unit (106) may be referred to as a memory controller or hardware memory controller in accordance with one or more embodiments of the invention.

In one or more embodiments of the invention, the hardware memory control unit (106) includes a register block (112) for each hardware memory segment. The register block (112) includes registers for storing control information for performing the power saving management of the hardware memory segment. In one or more embodiments of the invention, the register block (112) includes a memory segment select register (114), a control register (116), a status register (118), a high threshold register (120), a low threshold register (122), a time period register (124), an access count register (126), and a time count register (128). Each of the aforementioned registers is discussed below in accordance with one or more embodiments of the invention.

In one or more embodiments of the invention, the memory segment select register (114) is configured to store an identifier of the hardware memory segment. The identifier of the hardware memory segment may be stored in the memory selection register (114) as a bit mask that includes a bit for each rank of each hardware memory module (104). Specifically, each rank is assigned a bit in the memory segment select register. If the bit corresponding to the rank is set, then the rank is included in the hardware memory segment corresponding to the register block (112). For example, if the computer system (100) has four hardware memory modules, each having four ranks, then the memory selection register may store at least sixteen bits. If two of the bits are set, then the two ranks corresponding to the two bits are in the hardware memory segment. The two ranks may be on the same or different hardware memory modules.

In one or more embodiments of the invention, the control register (116) provides control information to configure the power savings management. Specifically, the control information defines how to perform the power savings management for the hardware memory segment. In one or more embodiments of the invention, the control register (116) stores an enable indicator (not shown) and a response action indicator (not shown).

In one or more embodiments of the invention, the enable indicator defines whether to perform the power savings management on the hardware memory segment in accordance with one or more embodiments of the invention. For example, if the enable indicator is set, then the counting of accesses to the hardware memory segment and the response actions (discussed below) may be performed. If the enable indicator is not set, then no power savings management is performed. In some embodiments of the invention, regardless of whether the enable indicator is set, the counting of accesses is performed. In such embodiments, the hardware memory segment may not perform a response action if the enable indicator is not set.

In one or more embodiments of the invention, the response action indicator stores the response action to perform at the end of the access count. The response actions may include, for example, whether to generate a trap, whether to automatically change the power savings mode, and/or whether to stop the counting of accesses to the hardware memory segment. In one or more embodiments of the invention, the response action indicator may correspond to a bit for each possible response action. For example, a trap bit may indicate whether to generate a trap when an out-of-band event occurs, an automatic bit may indicate whether to automatically change the power savings mode, and a stop bit may indicate whether to stop the access counting in accordance with one or more embodiments of the invention. Alternatively, rather than having a bit for each response action, if the response action to perform is mutually exclusive, then a single bit may be used for more than one response action. For example, if the response action is either to generate a trap or automatically change the power savings mode, then a single bit may represent the response action.

Continuing with the register block, in one or more embodiments of the invention, the status register (118) includes information about the current status of the hardware memory segment. In one or more embodiments of the invention, all chips in the hardware memory segment have the same status represented in the status register (118). In one or more embodiments of the invention, the status register (118) includes a trap indicator that identifies whether the register block (112) generated trap, a low water mark indicator to identify whether the last out-of-band event was that the access count was less than the low threshold, and a high water mark indicator to identify whether the last out-of-band event was that the access count was greater than the high threshold. In one or more embodiments of the invention, the status register (118) further includes an in-band indicator to indicate whether the last access count was greater than the low threshold and less than the high threshold, a running indicator to indicate whether the access count is currently counting accesses, and a last mode indicator to indicate the last power savings mode that was automatically set. In one or more embodiments of the invention, the last mode indicator only indicates the last mode when the response action indicator identifies that the response action is to automatically change the power savings mode. In one or more embodiments of the invention, if the last mode indicator is set, then the power savings mode was last automatically set to PPSE mode. If the last mode indicator is not set, then the power savings mode was last automatically set to PPFE mode. In one or more embodiments of the invention, each indicator discussed in reference to FIG. 1 may be represented by a single bit or multiple bits without departing from the scope of the invention.

In one or more embodiments of the invention, the high threshold register (120) stores the high threshold value. Specifically, the value in the high threshold register (120) is the maximum number of memory accesses before the power savings mode should be switch in accordance with one or more embodiments of the invention. In one or more embodiments of the invention, the high threshold register (120) stores a 32 bit number.

In one or more embodiments of the invention, the low threshold register (122) stores the low threshold value. Specifically, the value in the low threshold register (122) is the minimum number of memory accesses before the power savings mode should be switched. In one or more embodiments of the invention, the low threshold register (122) stores a 32 bit number.

In one or more embodiments of the invention, the time period register (124) stores a value indicating the duration of time to perform the access count. Specifically, the access count is performed over the duration of time specified in the time period register (124) in accordance with one or more embodiments of the invention. In one or more embodiments of the invention, the time period register (124) stores a thirty two bit number.

In one or more embodiments of the invention, the access count register (126) stores the current access count to the hardware memory segment. In one or more embodiments of the invention, for each memory access (e.g., read or write) to the hardware memory segment, the access count stored in the access count register (126) is incremented.

In one or more embodiments of the invention, the time count register (128) is a clock that counts to the value in the time period register (124). Specifically, the time count register (128) maintains the amount of time that elapsed since the start of the current period. The time count in the time count register (128) may increment or decrement.

Although FIG. 1 shows the register block as a part of the hardware memory control unit (106), the register block (112) may be a separate component from the hardware memory control unit (106) in accordance with one or more embodiments of the invention. Further, although FIG. 1 shows a certain configuration of registers, the data represented by one or more registers may be combined or partitioned into different registers without departing from the scope of the invention.

In one or more embodiments of the invention, the computer system (100) includes additional components not shown in FIG. 1. For example, the computer system (100) may include a persistent storage device (not shown) (e.g., a hard disk, an optical drive such as a compact disk drive or digital versatile disk (DVD) drive, a flash memory stick, etc.), a cache, and numerous other elements and functionalities typical of today's computers (not shown). The computer system (100) may also include input devices, such as a keyboard, a mouse, a microphone, a touch screen, etc. Further, the computer system (100) may include output devices, such as a monitor (e.g., a liquid crystal display (LCD), a plasma display, or cathode ray tube (CRT) monitor). The computer system (100) may be connected to a network (not shown) (e.g., a local area network (LAN), a wide area network (WAN) such as the Internet, or any other type of network) via a network interface connection (not shown). Those skilled in the art will appreciate that many different types of computer systems exist, and the aforementioned input and output devices may take other forms and may be the same device. Alternatively, the input and output devices may be external devices to the computer system (100). Further, software instructions to perform embodiments of the invention may be stored on a computer readable medium such as a compact disc (CD), a diskette, a tape, physical memory, or any other computer readable storage device. For example, one or more embodiments of the invention may be implemented in firmware, microcode, and/or hardware.

Figure 2:
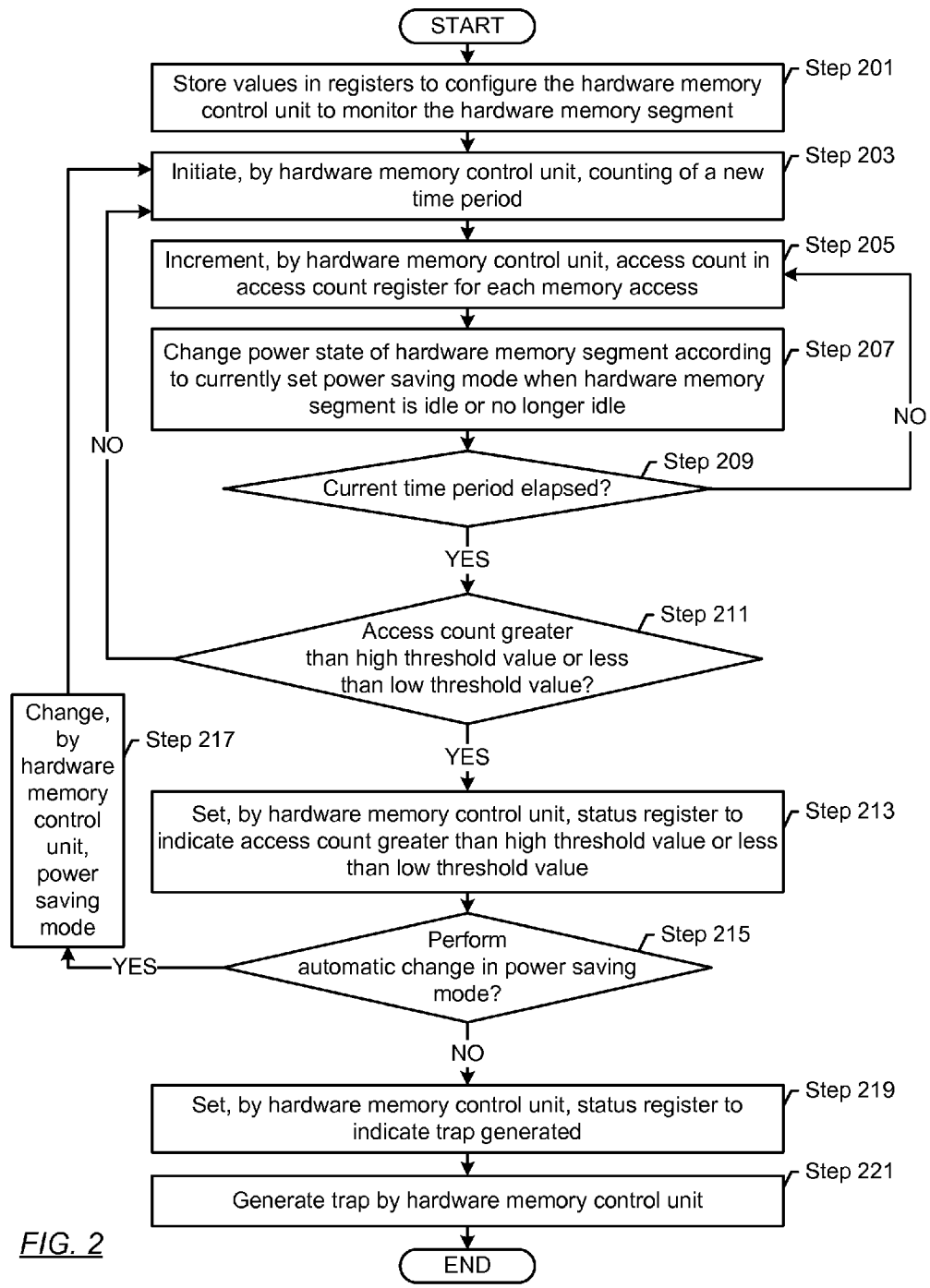
FIG. 2 shows a flowchart in accordance with one or more embodiments of the invention.

FIG. 2 shows a flowchart in accordance with one or more embodiments of the invention. In one or more embodiments of the invention, the steps shown in FIG. 2 may be performed for each register block. While the various steps in this flowchart are presented and described sequentially, one of ordinary skill will appreciate that some or all of the steps may be executed in different orders, may be combined or omitted, and some or all of the steps may be executed in parallel. In one or more embodiments of the invention, some steps discussed in FIG. 2 may be passively performed or presented only for clarity. For example, determining whether an event occurred may be detecting that a register overflowed indicating the occurrence of the event. In the example, if the event does not occur, then the determination may not correspond to an action that is actually performed.

Returning to FIG. 2, in Step 201, values are stored in the registers to configure the hardware memory control unit to monitor the hardware memory segment in accordance with one or more embodiments of the invention. In one or more embodiments of the invention, the values initially stored in the registers may be default values of the computer system. Further, the values may be configured, for example, using software that executes on the computer system or on a remote computer system connected to the computer system. In one or more embodiments of the invention, the values that are configured include the values in the memory segment select register, the high threshold value in the high threshold register, the low threshold value in the low threshold register, the time period in the time period register, and the response action indicator and the enable indicator in the control register. Storing the values in the registers may be performed initially and anytime after starting an access count in accordance with one or more embodiments of the invention. For example, after the computer system is executing, an administrator monitoring the computer system may determine that the low water mark is too high causing the computer system to not perform as well. Specifically, the administrator may decide that the memory is PPSE mode too often. In such a scenario, the administrator may decrease the low threshold value after the computer starts executing.

Continuing with FIG. 2, in Step 203, the hardware memory control unit initiates the counting of a new time period in accordance with one or more embodiments of the invention. In one or more embodiments of the invention, the hardware memory control unit checks the enable indicator in the control register of the register block is set. If the enable indicator is set, then the hardware memory control unit initiates the access count. If the enable indicator is not set, then the hardware memory control unit may not initiate an access count. In one or more embodiments of the invention, to initiate the access count, the hardware memory control unit copies the value from the time period register to the time count register. After the value is transferred, the time count register may proceed to decrement at a predefined interval. Further, in one or more embodiments of the invention, the hardware memory control unit may set the running indicator in the status register to indicate that an access count is being performed.

In Step 205, the hardware memory control unit increments the access count in the access count register for each memory access to the hardware memory segment. In one or more embodiments of the invention, the hardware memory control unit increments the access count and processes each request each time the hardware memory control unit receives a request for memory stored in the hardware memory segment specified by the hardware memory segment select register. In one or more embodiments of the invention, because the access count is monitored in hardware by the hardware memory control unit, the processor is not involved in monitoring each access to the hardware memory segment. Therefore, the computer processor may attend to software execution without spending execution cycles monitoring memory.

In Step 207, the power state of the hardware memory segment is changed according to the currently set power saving mode when the hardware memory segment is idle or no longer idle. Specifically, during execution, the hardware memory control unit may be configured to detect when the hardware memory segment is idle and not processing requests. When the hardware memory segment is idle, the memory control unit switches the power state from an active state to the power down state specified by the power saving mode of the hardware memory segment. For example, if the power saving mode is PPSE mode, then the hardware memory control unit switches the power state from the active state to PPSE state. As another example, if the power saving mode is PPFE mode, then the hardware memory control unit switches the power state from the active state to PPFE state. Conversely, when memory requests are received for the hardware memory segment, the hardware memory control unit may switch the power state from the power down state back to the active state. Accordingly, the power saving mode defines which power down state the hardware memory segment will switch to when idle. Because different power down states have different power consumption and different enter and exit times, the power down state that the hardware memory segment switches to affects performance and energy consumption of the computer system. In one or more embodiments of the invention, the switching between power states is independent of the memory access monitoring. Specifically, switching between the power states may be performed at any time during, before, or after monitoring the memory accesses of the hardware memory segment in accordance with one or more embodiments of the invention.

Continuing with FIG. 2, in Step 209, a determination is made as to whether the current time period elapsed in accordance with one or more embodiments of the invention. In one or more embodiments of the invention, the current time period elapses when the time count register overflows. In one or more embodiments of the invention, the time count register overflows when the time count value in the time count register is decremented to a value of zero. If the current time period has not elapsed, then the hardware memory control unit continues to increment the access count in the access count register for each memory access to the hardware memory segment in Step 205 in accordance with one or more embodiments of the invention.

Alternatively, if the current time period has elapsed, the running indicator in the status register may be updated to reflect that an access count is currently not being performed (not shown). In Step 211, a determination is made whether the access count is greater than the high threshold value or less than the low threshold value. In one or more embodiments of the invention, when the current time period elapsed, the access count is compared with the high threshold value in the high threshold register and/or the low threshold value in the low threshold register to determine whether the access count is in-band or out-of-band. As discussed above, when the access count is equal to the high threshold value or the low threshold value, the access count may be considered in-band in one or more embodiments of the invention. In alternative embodiments, the access count may be considered out-of-band when the access count is equal to the high threshold value or the low threshold value.

To determine whether the access count is in-band or out-of-band, the access count may be initially compared against either the high threshold value or the low threshold value. If the access count is within the bands of the register (e.g., less than the high threshold value or greater than the low threshold value), then the access count is compared against the second register. Alternatively, the access count may be compared against the values in both registers regardless of whether the access count is out-of-band for the first register.

Continuing with FIG. 2, if the access count is not greater than the high threshold value or less than the low threshold value, then the hardware memory control unit may initiate the counting of a new time period in Step 203. Specifically, the access count register is reset for the next time period. Accordingly, the method may repeat for the next time period. Additionally, although not shown in FIG. 2, the in-band indicator in the status register may be set to indicate that the last access count is in-band.

Alternatively, if the access count is greater than the high threshold value or less than the low threshold value, then in Step 213, the hardware memory control unit sets the status register to indicate that access count is the greater than the high threshold value or less than the low threshold value. For example, if the access count is less than the low threshold, then the hardware memory control unit may set the low threshold indicator to indicate that the access count is less than the low threshold and the high threshold indicator to indicate that the access count is less than the high threshold. Conversely, as another example, if the access count is greater than the high threshold, then the hardware memory control unit may set the low threshold indicator to indicate that the access count is greater than the low threshold and the high threshold indicator to indicate that the access count is greater than the high threshold. Further, the hardware memory control unit may set the in-band indicator to indicate that the access count is out-of-band.

In Step 215, a determination is made whether to perform an automatic change in the power saving mode of the hardware memory segment. Specifically, when the access count is out-of-band, the hardware memory control unit checks the response action indicator in the access control register to determine whether to perform the automatic change in the power saving mode. The hardware memory control unit performs the action(s) specified by the response action indicator in the control register.

If a determination is made to perform an automatic change in the power saving mode, in Step 217, the hardware memory control unit changes the power saving mode of the hardware memory segment in accordance with one or more embodiments of the invention. In one or more embodiments of the invention, the hardware memory control unit further sets the status register to indicate the current power saving mode after the change (not shown).

In Step 219, the hardware memory control unit sets the status register to indicate that a trap is generated. Specifically, the hardware memory control unit may set the trap indicator to indicate that the trap is generated. In Step 221, the hardware memory control unit generates a trap in accordance with one or more embodiments of the invention. In one or more embodiments of the invention, the trap interrupts the processor from processing other commands. The operating system via the processor may issue a command to the hardware memory control unit to change the power saving mode based on the trap in accordance with one or more embodiments of the invention. When the processor responds to the trap, the hardware memory control unit may reset the trap indicator.

In one or more embodiments of the invention, although FIG. 2 shows generating a trap and automatically changing the power saving mode as mutually exclusive, the generating of the trap and the automatically changing the power saving mode may both be performed without departing from the scope of the invention.

Figure 3:
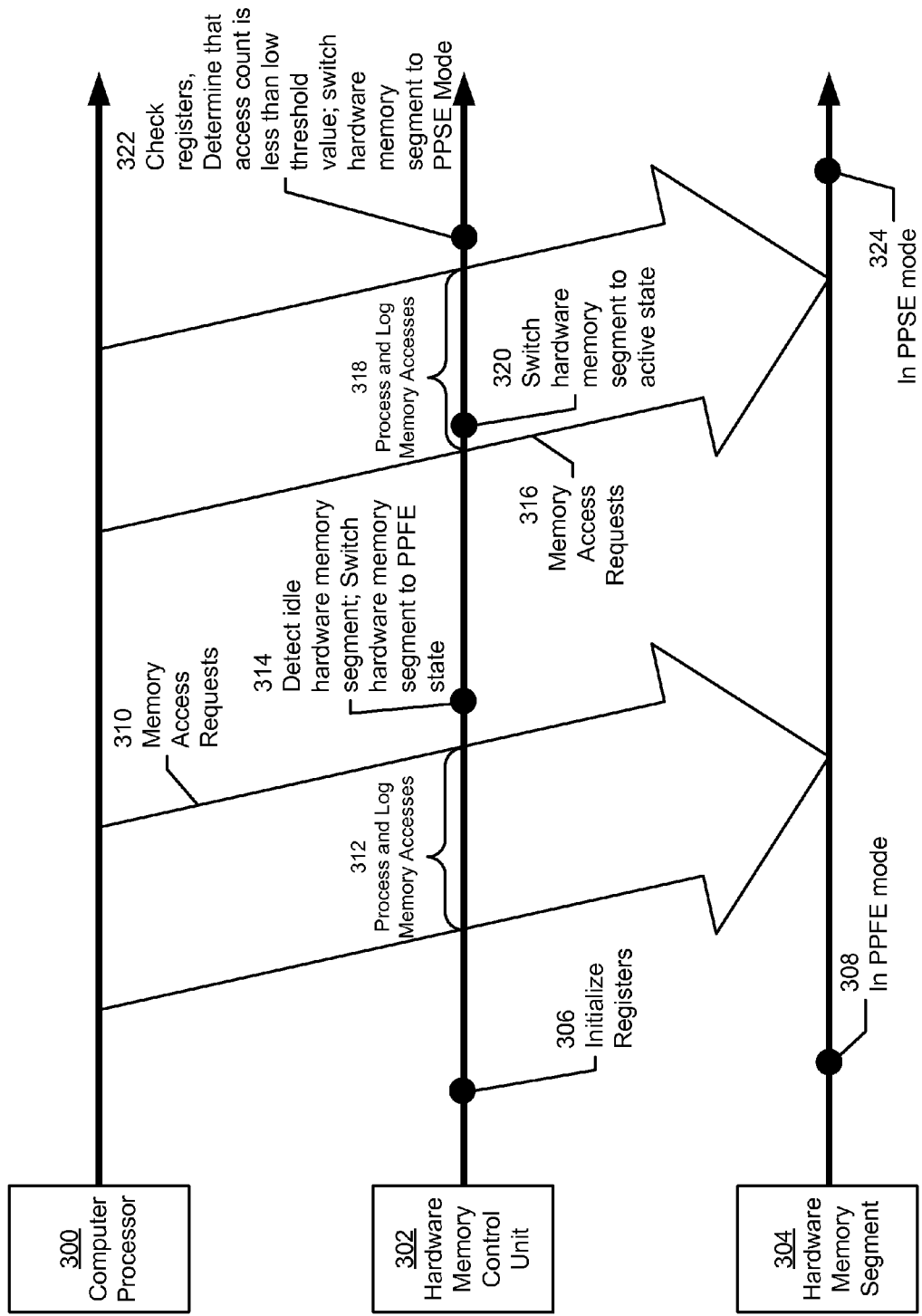
FIG. 3 shows an example timing diagram in accordance with one or more embodiments of the invention.

FIG. 3 shows an example timing diagram in accordance with one or more embodiments of the invention. The following example is for explanatory purposes only and not intended to limit the scope of the invention. Specifically, FIG. 3 shows actions performed by the computer processor (300), the hardware memory control unit (302), and the hardware memory segment (304) in accordance with one or more embodiments of the invention.

In the example, the hardware memory control unit (302) initializes the registers (306) in preparation of an access count. Accordingly, the hardware memory control unit (302) starts the access count. Further, for the purposes of this example, consider the scenario that the hardware memory segment (304) is initially in PPFE mode (308).

During the access count, the computer processor (300) sends memory access requests (310) to the hardware memory control unit (302). The hardware memory control unit (302) processes and logs each memory access request (312). Specifically, for each memory access request, the hardware memory control unit (302) identifies the location on the hardware memory modules (not shown) required by the memory access request. The hardware memory control unit (302) further identifies the rank containing the identified location in accordance with one or more embodiments of the invention. Based on the rank, the hardware memory control unit (302) identifies the register block listing the rank in the hardware memory segment select register. The hardware memory control unit (302) increments the access count in the register block to log the memory access.

Next, for the purposes of the example, consider the scenario in which the computer processor (300) stops sending memory access requests for the hardware memory segment (304). In such scenario, the hardware memory segment (304) becomes idle. The hardware memory control unit (302) detects that the hardware memory segment (304) is idle and switches the hardware memory segment (304) to PPFE state based on being idle and being in PPFE mode (314).

When additional memory access requests (316) are received for the hardware memory segment (304), the hardware memory control unit (302) processes and logs the memory access requests (318). Specifically, for the first memory access request (not shown), the hardware memory control unit (302) switches the hardware memory segment (304) back to an active state (320). Because the hardware memory segment was in a PPFE state, the switch is fast, but the time in PPFE state conserved less power.

When a time period elapses (as specified in the time count register), the hardware memory control unit (302) checks the registers. Upon checking the access count register, the high threshold register, and the low threshold register, the hardware memory control unit determines that the access count is less than the low threshold value. Accordingly, the hardware memory control unit switches the hardware memory segment to PPSE mode (322) based on the response action indicator in the control register. Because the hardware memory segment (304) is in PPSE mode (324), the next time the hardware memory segment (304) is idle, the hardware memory segment (304) switches to a power down state that conserves more power.

Although FIG. 3 shows monitoring the hardware memory segment and detecting the idle condition on a single timing diagram, the timing of the two actions may be independent. For example, the hardware memory control unit may switch the power saving mode of the hardware memory segment while processing requests for the hardware memory segment. Further, in one or more embodiments of the invention, portions of the hardware memory segment may be in a power down state while other portions are in an active state without departing from the scope of the invention.

As shown by way of the example, because all processing in the example is performed by the hardware, the processor can accomplish other processing. Therefore, the monitoring of the hardware memory segment does not affect the processing power of the computer system in accordance with one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hardware memory control unit comprising:
a register block comprising:
a first access count register for storing an access count for a first hardware memory segment;
a first low threshold register for storing a low threshold for the first hardware memory segment;
a first high threshold register for storing a high threshold for the first hardware memory segment; and
a status register for storing a current status for the first hardware memory segment, wherein the current status stored in the status register comprises:
a trap bit to indicate whether a trap is generated;
a low bit to indicate whether a last event is the access count stored in the first access count register is less than the low threshold stored in the first low threshold register;
a high bit to indicate whether a last event is the access count stored in the first access count register is greater than the high threshold stored in the first high threshold register;
a running bit to indicate whether the access count in the first access count register is currently incrementing; and
a mode bit to indicate a power saving mode of the first hardware memory segment; and
hardware logic configured to:
increment the access count stored in the first access count register for each memory access to the first hardware memory segment performed during a first predefined duration of time; and
at the end of the first predefined duration of time:
generate the trap when the access count stored in the first access count register is less than the low threshold stored in the first low threshold register; and
generate the trap when the access count stored in the first access count register is greater than the high threshold stored in the first high threshold register,
wherein the power saving mode of the first hardware memory segment is modified when the trap is generated.

2. The hardware memory control unit of claim 1, wherein the register block further comprises:
a second access count register for storing an access count for a second hardware memory segment;
a second low threshold register for storing a low threshold for the second hardware memory segment; and
a second high threshold register for storing a high threshold for the second hardware memory segment, and
wherein the hardware logic is further configured to:
increment the access count stored in the second access count register for each memory access to the second hardware memory segment performed during a second predefined duration of time;
at the end of the second predefined duration of time:
perform a response action specified by a response action indicator when the access count stored in the second access count register is less than the low threshold stored in the second low threshold register; and
perform the response action specified by the response action indicator when the access count stored in the access count register is greater than the high threshold stored in the second high threshold register.

3. The hardware memory control unit of claim 2, wherein the response action is to automatically switch the power saving mode of the second hardware memory segment to power down precharge slow exit when access count stored in the second access count register is less than the low threshold stored in the second low threshold register, and
wherein the response action is to automatically switch the power saving mode of the second hardware memory segment to power down precharge fast exit when the access count stored in the second access count register is greater than the high threshold in the second high threshold register.

4. The hardware memory control unit of claim 1, wherein the first hardware memory segment comprises a first hardware memory module and a second hardware memory module.

5. The hardware memory control unit of claim 4, wherein the first hardware memory module is a dual inline memory module (DIMM).

6. The hardware memory control unit of claim 1, wherein the first hardware memory segment is defined by a plurality of ranks on a hardware memory module.

7. The hardware memory control unit of claim 1, wherein the power saving mode of the first hardware memory segment is changed between power down precharge fast exit and power down precharge slow exit.

8. A hardware memory control unit comprising:
a register block comprising:
a first access count register for storing an access count for a first hardware memory segment;
a first low threshold register for storing a low threshold for the first hardware memory segment;
a first high threshold register for storing a high threshold for the first hardware memory segment; and
a status register for storing a current status for the first hardware memory segment, wherein the current status stored in the status register comprises:
a trap bit to indicate whether a trap is generated;
a low bit to indicate whether a last event is the access count stored in the first access count register is less than the low threshold stored in the first low threshold register;
a high bit to indicate whether a last event is the access count stored in the first access count register is greater than the high threshold stored in the first high threshold register;
a running bit to indicate whether the access count in the first access count register is currently incrementing; and
a mode bit to indicate a power saving mode of the first hardware memory segment; and
hardware logic configured to:
increment the access count stored in the first access count register for each memory access to the first hardware memory segment performed during a first predefined duration of time; and
at the end of the first predefined duration of time:
automatically modify the power saving mode of the first hardware memory segment to power down precharge slow exit when the access count stored in the first access count register is less than the low threshold stored in the first low threshold register; and
automatically modify the power saving mode of the hardware memory segment to power down precharge fast exit when the access count stored in the first access count register is greater than the high threshold stored in the first high threshold register.

9. The hardware memory control unit of claim 8, wherein the register block further comprises:
a second access count register for storing an access count for a second hardware memory segment;
a second low threshold register for storing a low threshold for the second hardware memory segment; and
a second high threshold register for storing a high threshold for the second hardware memory segment, and
wherein the hardware logic is further configured to:
increment the access count stored in the second access count register for each memory access to the second hardware memory segment performed during a second predefined duration of time;
at the end of the second predefined duration of time:
perform a response action specified by the response action indicator when the access count stored in the second access count register is less than the low threshold stored in the second low threshold register; and
perform the response action specified by the response action indicator when the access count stored in the access count register is greater than the high threshold stored in the second high threshold register.

10. The hardware memory control unit of claim 9, wherein the response action is to automatically switch the power saving mode of the second hardware memory segment to power down precharge slow exit when the access count stored in the second access count register is less than the low threshold stored in the second low threshold register, and
wherein the response action is to automatically switch the power saving mode of the second hardware memory segment to power down precharge fast exit when the access count stored in the second access count register is greater than the high threshold stored in the second high threshold register.

11. The hardware memory control unit of claim 8, wherein the first hardware memory segment comprises a first hardware memory module and a second hardware memory module.

12. The hardware memory control unit of claim 11, wherein the first hardware memory module is a dual inline memory module (DIMM).

13. The hardware memory control unit of claim 8, wherein the first hardware memory segment is defined by a plurality of ranks on a hardware memory module.

14. A hardware memory control unit comprising:
a register block for each hardware memory segment of a plurality of hardware memory segments, wherein the register block comprises:
an access count register for storing an access count of memory accesses performed to the hardware memory segment during a predefined duration of time;
a high threshold register for storing a high threshold, wherein the high threshold defines a maximum number of memory accesses before a power saving mode of the hardware memory segment is switched to power down precharge fast exit;
a low threshold register for storing a low threshold, wherein the low threshold defines a minimum number of memory accesses before the power saving mode of the hardware memory segment is switched to power down precharge slow exit;

a status register for storing the current status of the hardware memory segment wherein the current status stored in the status register comprises:
a trap bit to indicate whether a trap is generated;
a low bit to indicate whether a last event is the access count stored in the access count register is less than the low threshold stored in a low threshold register;
a high bit to indicate whether a last event is the access count stored in the access count register is greater than the high threshold stored in the high threshold register;
a running bit to indicate whether the access count in the access count register is currently incrementing; and
a mode bit to indicate the power saving mode of the hardware memory segment; and
a control register for storing a response action indicator; and
hardware logic configured to:
perform a response action specified by the response action indicator when the access count stored in the access count register is less than the low threshold stored in the low threshold register; and
perform the response action specified by the response action indicator when the access count stored in the access count register is greater than the high threshold stored in the high threshold register.

15. The hardware memory control unit of claim 14, wherein the response action is to generate the trap to a computer processor.

16. The hardware memory control unit of claim 14, wherein the response action is to automatically switch the power saving mode to power down precharge slow exit when the access count is less than the low threshold, and wherein the response action is to automatically switch the power saving mode to power down precharge fast exit when the access count is greater than the high threshold.

17. The hardware memory control unit of claim 14, wherein the register block further comprises:
a memory segment select register for storing a segment identifier of the hardware memory segment corresponding to the register block.

18. The hardware memory control unit of claim 14, wherein the register block further comprises:
a time period register for storing a value defining the predefined duration of time; and
a time counter register for counting the predefined duration of time.

19. The hardware memory control unit of claim 14, wherein the hardware memory control unit is further configured to:
change, in response to detecting a hardware memory segment of the plurality of hardware memory segments is idle, a power state of the hardware memory segment according to the power saving mode of the hardware memory segment.

* * * * *